April 28, 1970     R. E. THOMAS     3,508,344
REVERSIBLE CONCEALED IMAGE DEVICE AND METHOD OF USE
Filed July 17, 1967
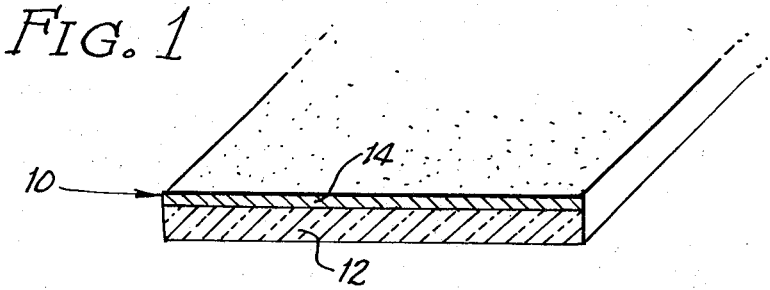
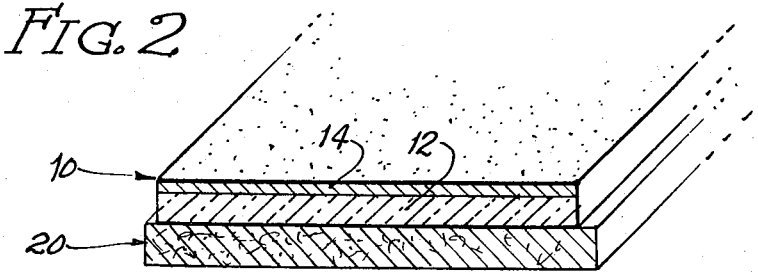
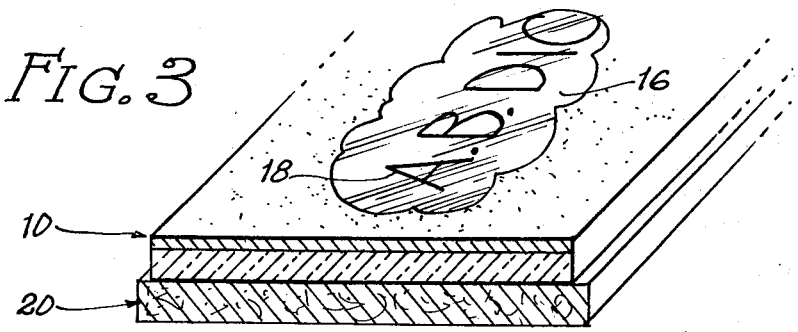
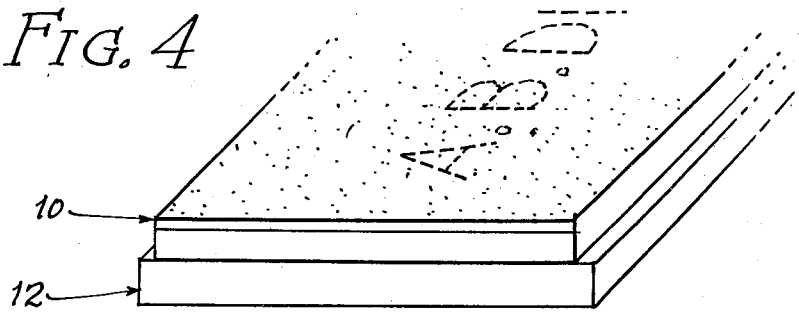
INVENTOR
Richard E. Thomas
by McDougall, Hersh, Scott and Ladd
Attys United States Patent Office 3,508,344
Patented Apr. 28, 1970

3,508,344
REVERSIBLE CONCEALED IMAGE DEVICE
AND METHOD OF USE
Richard E. Thomas, Chicago, Ill., assignor to A. B. Dick
Company, Niles, Ill., a corporation of Illinois
Filed July 17, 1967, Ser. No. 653,776
Int. Cl. G09b 3/00
U.S. Cl. 35—9                                    8 Claims

ABSTRACT OF THE DISCLOSURE

A reversible concealed image device which makes use of a covering sheet formed of a transparent base material having an opaque blush coating which is rendered transpicuous in portions wetted with a volatilizable fluid and which reverses to the opaque blush coating upon removal of the fluid or liquid by volatilization whereby the covering sheet can be used in reversible concealed imaging devices for readability of the image concealed by the covering sheet.

This invention relates to a unique and novel assembly and use which may be referred to as a reversible concealed image device that embodies a covering sheet overlying a sheet having a visible image or information thereon in which the covering sheet is opaque completely to conceal the visible image on the information sheet but wherein the covering sheet, when wet in predetermined areas with a vaporizable fluid, becomes transpicuous for clear readability of the image immediately underlying the wetted portions and which returns to opaqueness completely to conceal the image upon evaporation of the fluid from the covering sheet.

A combination which makes use of a covering sheet of the type described which permits unique and novel applications and use suggested by the following: a learning device in which the covering sheet is employed in combination with instructional material on the underlying information sheet whereby the answer to certain questions can be made visible by wetting the covering sheet in the appropriate places and in which the answer remains visible only for a short period of time after which the image becomes completely concealed. Thus, the assembly can be used time and time again as a review or testing medium by students or otherwise.

The assembly can find excellent use as an instructional medium for learning or for testing or as a testing medium in the classroom.

The combination described gives the student or operator immediate feedback of knowledge or an indication of the correctness of a proposed answer.

It retains the interest of the learner and gives motivation to the effort expended to learning.

The combination described makes possible programmed instruction and testing materially to enhance the learning process and examination.

It is an object of this invention to make use of a covering sheet of the type described and an assembly which embodies same in which the covering sheet can be processed though number of cycles of opaqueness and transpicuousness in selected areas without deteriortion of the sheet and without alteration in the appearance of the sheet whereby the previously marked areas might otherwise be identifiable.

These and other objects and advantages of this invention will hereinafter appear and for purposes of illustration, but not of limitation, an embodiment of the invention is shown in the accompanying drawing in which:

FIGURE 1 is a perspective view partially in section of a covering sheet employed in the practice of this invention;

FIGURE 2 is a perspective view partially in section of the assembly of the covering sheet of FIGURE 1 overlying printed informational material;

FIGURE 3 is a view similar to that of FIGURE 2 showing the step of wetting the surface of the covering sheet in a selected area to transparentize the covering sheet for readability of the information immediately underlying the wetted areas; and, FIGURE 4 is a view similar to that of FIGURES 2 and 3 showing the return of the covering sheet to opaqueness after evaporation of the wetting material.

The conversion sheet 10 employed in the practice of this invention comprises a base sheet 12 in the form of a thin, flexible film of clear or transparent plastic material having a coating 14 on one surface thereof which is replete with fine voids uniformly distributed throughout the coating to provide what is referred to as "blush" coating whereby the composite sheet becomes opaque so that visibility therethrough is substantially completely blocked. The preparation of blush coatings of the type described and the characteristics thereof are set forth more specifically in U.S. Patents Nos. 3,147,134 and 3,057,999 which are incorporated herein by reference.

As pointed out in the aforementioned patents, it is believed that the theoretical concepts in the preparation of a blush coating reside in the utilization of a coating composition formulated with a mixture of solvents or diluents in which the last to evaporate is selected of a non-solvent for the binder or film from materials and is uniformly dispersed therein as fine particles. Thus, the final removal of the solvent component leaves finely dispersed voids throughout the coating to form the blush coating. Water is very often used as the dispersed non-solvent component with various film forming or resinous binders because of its non-solvency, its easy dispersibility in the coating and the volatilizable fluid, though it usually remains to be the last of the diluents to be volatilized off.

It has been found that when the surface of the blush coating is wet with a volatilizable fluid that has an index of refraction in somewhat the same range as that of the material making up the coating, the portion wet with the liquid becomes transparent to transpicuous, depending somewhat on the differences of refraction index, whereby the wet portions 16 becomes somewhat like a window to permit full visibility through the covering sheet. It is believed that the applied fluid, usually water, substantially fills the voids in the underlying portion of the coat thereby temporarily to transparentize the coating. As the liquid subsequently evaporates off, the original voids are left to return the sheet to its original opaque state. For purposes of marking, it is desirable to make use of a fluid or liquid which does not damage the coating or leave a marking so that the portion which has been transparentized will not be evident.

Thus, the blush coated sheet finds new use as a device referred to as a reversible concealed image device whereby an image 18 printed on the surface of an instructional sheet 20 can be made visible through the covering sheet by wetting the desired portions of the surface, with subsequent reversal of the sheet to its opaque condition completely to conceal the image, as illustrated in FIGURE 4.

As the transparent film base 12, use can be made of a sheet of plastic material such as Pliofilm, polyvinylchloride, a polyester such as Mylar and the like.

The following are examples of formulations which may be coated onto the surface of the base sheet to form the blush coating. The examples are given by way of illustration but not by way of limitation.

EXAMPLE 1

| | Parts by weight |
|---|---|
| Acetone | 75.1 |
| Methylmethacrylate (Lucite 2042) | 6.6 |
| Diethyl phthalate | 1.6 |
| Polyacrylate (Rhoplex B-15) | 1.1 |
| Water | 11.0 |

EXAMPLE 2

| | |
|---|---|
| Acetone | 45.0 |
| Ethyl cellulose | 3.0 |
| Diethyl phthalate | .75 |
| Polyethyl chloride (Saran F 22) | 3.0 |
| Water | 5.0 |

EXAMPLE 3

| | |
|---|---|
| Polyvinyl chloride resin (Bakelite UNCH) | 7.0 |
| Actone | 75.0 |
| Dibutyl phthalate | 1.5 |
| Water | 10.0 |

EXAMPLE 4

| | |
|---|---|
| Vinylite SYHM | 3.0 |
| Acetone | 45.0 |
| Water | 3.0 |

The compositions of the foregoing examples are mixed to form a dispersion which is coated onto the base sheet in coating weights of 1-6 pounds per 3000 square feet of surface area and then air dried.

Additional formulations for the preparation of suitable blush coatings may be derived from the aforementioned patents.

When dried, an opaque covering sheet 10 is obtained which is thin and highly flexible and capable of assembly over an instruction sheet 20 completely to seal the printing or other image on the surface of the underlying instructional sheet.

As the transparentizing liquid or marking material, use can be made of water which is readily available and which has a refractive index sufficiently close to the materials making up the coating. Water is vaporizable and does not disturb or damage the coating composition making up the blush coating except to fill the voids and transparentize the portions of the coating that are wet. It will be understood that the marking material may be applied to the blush coating by a brush, an applicator or other conventional means.

In use, when the blush coating 14 is wet with water, the portions 16 that are wet become transparent or transpicuous for complete and clear readability of the printed material 18 on the underlying surface of the instruction sheet 20 thereby to enable reading of the otherwise concealed information. Upon evaporation of the water, the window becomes closed and the printed or written material on the underlying instruction or information sheet again becomes completely concealed.

A covering sheet of this character finds novel use as a re-usable, reversible response device. The covering sheet can be used with instructional material that is capable of being seen for examination only during the short period of time that the blush coating 14 is wet with the marking material. During this period, the user can see and receive instructions or immediate responses to his choices on curriculum material, etc.

It will be apparent from the foregoing that I have provided a new and novel use for a blush coated sheet as an instructional medium. It will be understood that changes may be made in the details of construction and operation without departing from the spirit of the invention especially as defined in the following claims.

I claim:

1. A reversible concealed image device comprising an imaged sheet having an image on a surface thereof and a covering sheet overlying the imaged surface formed of a transparent base and a blush coating on the outer surface of the base which renders the covering sheet opaque to conceal the underlying image and which becomes transpicuous upon wetting with a volatile marking material that is a non-solvent for the blush coating and which returns to its original opaque state upon evaporation of the marking material to again re-conceal the image.

2. A device as claimed in claim 1 in which the transparent base comprises a thin film of a clear plastic material.

3. A device as claimed in claim 1 in which the marking material is water.

4. A method for learning which comprises providing a reversible concealed image assembly comprising an imaged information sheet having the learning material present as an image on the surface thereof, a covering sheet formed of a transparent base and a blush coating on the surface away from the information sheet with the covering sheet overlying the surface of the information sheet completely to conceal the image, marking selected portions of the blush coating with a volatile liquid that is a non-solvent for the blush coating whereby the wetted portions become transpicuous to enable readability of the image immediately underlying the wetted portions, and allowing the marking liquid to evaporate off whereby the transpicuous portions revert back to their original blush state completely to re-conceal the underlying image.

5. The method as claimed in claim 4 in which the marking material is water.

6. The method as claimed in claim 5 in which the marking material is applied by a brush.

7. The method as claimed in claim 4 in which the marking material is applied by an applicator.

8. The method as claimed in claim 4 in which the transparent base is a flexible sheet formed of a film of clear plastic material.

References Cited

UNITED STATES PATENTS

| 1,866,545 | 7/1932 | Cohen | 35—9 |
| 2,618,866 | 11/1952 | Adams | 35—9 |
| 3,031,328 | 4/1962 | Larsen | 117—36.7 |
| 3,139,689 | 7/1964 | Quintel et al. | 35—9 |
| 3,363,336 | 1/1968 | Skinner | 35—9 X |

EUGENE R. CAPOZIO, Primary Examiner

W. H. GRIEB, Assistant Examiner

U.S. Cl. X.R.

117—1.7; 283—6